(12) United States Patent
Woodthorpe

(10) Patent No.: US 9,073,063 B2
(45) Date of Patent: Jul. 7, 2015

(54) LIQUID TREATMENT SYSTEM

(75) Inventor: Mark Owen Woodthorpe, Sunbury (AU)

(73) Assignee: BEIJING CHINA WATER GOLDEN WATER DESALINATION TECHNOLOGY APPLICATION AND RESEARCH CO., LTD, Xicheng District, Beijing (CN)

(*) Notice: Subject to any disclaimer, the term of this patent is extended or adjusted under 35 U.S.C. 154(b) by 659 days.

(21) Appl. No.: 13/499,433

(22) PCT Filed: Sep. 29, 2010

(86) PCT No.: PCT/AU2010/001276
§ 371 (c)(1),
(2), (4) Date: May 22, 2012

(87) PCT Pub. No.: WO2011/038452
PCT Pub. Date: Apr. 7, 2011

(65) Prior Publication Data
US 2012/0223019 A1 Sep. 6, 2012

Related U.S. Application Data

(60) Provisional application No. 61/247,233, filed on Sep. 30, 2009.

(51) Int. Cl.
*C02F 1/24* (2006.01)
*B03D 1/24* (2006.01)
*B03D 1/14* (2006.01)
*B03D 1/02* (2006.01)

(52) U.S. Cl.
CPC ............... *B03D 1/24* (2013.01); *B03D 1/1443* (2013.01); *B03D 1/1431* (2013.01); *C02F 1/24* (2013.01); *C02F 2301/066* (2013.01); *B03D 1/028* (2013.01); *B03D 1/1412* (2013.01); *B03D 1/1475* (2013.01)

(58) Field of Classification Search
None
See application file for complete search history.

(56) References Cited

U.S. PATENT DOCUMENTS 3,352,420 A * 11/1967 Krofta ............................ 210/205
3,448,044 A * 6/1969 Garrett .......................... 210/704
5,525,238 A 6/1996 Menke

FOREIGN PATENT DOCUMENTS

| CA | 1289848 | 10/1991 |
| DE | 3733583 A1 * | 4/1989 |
| JP | 60-022984 A * | 2/1985 |

OTHER PUBLICATIONS

International Search Report and Written Opinion for PCT/AU2010/001276, mailed Dec. 9, 2010; ISA/AU.

* cited by examiner

*Primary Examiner* — Thomas M Lithgow
(74) *Attorney, Agent, or Firm* — Gokalp Bayramoglu

(57) ABSTRACT

A liquid treatment system using gas flotation to separate suspended matter from liquid influent, including a flotation tank into which the liquid influent is fed through an inlet, an outlet conduit through which treated effluent is fed from the flotation tank, a separation conduit for feeding liquid to a bubble release point, means for pressurising the liquid in the separation conduit and dissolving gas in the pressurised liquid, wherein an energy recovery device is used for reducing pressure of the liquid before the bubble release point such that gas bubbles are released into the flotation tank for floating said suspended matter to a surface of the liquid in the tank, and wherein the energy recovery device supplies energy obtained through said pressure reduction of the liquid.

4 Claims, 3 Drawing Sheets

LIQUID TREATMENT SYSTEM

CROSS-REFERENCE TO RELATED APPLICATIONS

This application is a 371 U.S. National Stage of International Application No. PCT/AU2010/001276, filed Sep. 29, 2010, and claims the benefit of U.S. Provisional Application No. 61/247,233, filed Sep. 30, 2009, the disclosures of which are herein incorporated by reference in their entirety.

FIELD OF THE INVENTION

This invention relates to separation of suspended matter from liquids by gas flotation, and more particularly, but not exclusively, to an energy efficient water or wastewater treatment system which uses Dissolved Air Flotation (DAF) to separate and remove suspended matter and/or precipitated or coagulated dissolved or colloidal matter from the water or wastewater.

BACKGROUND OF THE INVENTION

It is known to use Dissolved Air Flotation (DAF) as a water treatment process to remove suspended matter (eg. solids, particulate matter or other impurities) from water. DAF may be used for the separation of solids, grease, oils and other impurities, and works by producing a stream of fine bubbles that attach to the suspended matter, floating it to the surface where it can then be removed by surface scraping or the like.

It has been demonstrated that the use of DAF can result in very good effluent quality, however the applicant has identified that there are some drawbacks to using DAF over other treatment methods. In particular, DAF is energy intensive as it requires high pressure pumping to provide sufficient pressure to dissolve air/gas in a liquid while other competing treatment processes do not require any high pressure pumping. The applicant has determined that it would be beneficial for there to be provided a DAF liquid treatment system with improved energy efficiency.

Examples of the present invention seek to provide an improved liquid treatment system which overcomes or at least alleviates one or more disadvantages of previously proposed DAF water treatment systems.

SUMMARY OF THE INVENTION

In accordance with one aspect of the present invention, there is provided a liquid treatment system using gas flotation to separate suspended matter from liquid influent, including a flotation tank into which the liquid influent is fed through an inlet, an outlet conduit through which treated effluent is fed from the flotation tank, a separation conduit for feeding liquid to a bubble release point, means for pressurising the liquid in the separation conduit and dissolving gas in the pressurised liquid, wherein an energy recovery device is used for reducing pressure of the liquid before the bubble release point such that gas bubbles are released into the flotation tank for floating said suspended matter to a surface of the liquid in the tank, and wherein the energy recovery device supplies energy obtained through said pressure reduction of the liquid.

Preferably, the separation conduit is in the form of a recycle conduit for feeding treated effluent to the bubble release point, said pressurising/dissolving means is arranged to pressurise the treated effluent in the recycle conduit and dissolve gas in the pressurised treated effluent, and the energy recovery device is used for reducing pressure of the treated effluent before the bubble release point, and wherein the energy recovery device supplies energy obtained through said pressure reduction of the treated effluent.

More preferably, the means for pressurising the treated effluent in the recycle conduit includes a recycle pump. In one form, pressurisation of the treated effluent by the recycle pump is powered or supplemented by energy provided by the energy recovery device. The energy supplied by the energy recovery device may be applied to reduce the energy required from external sources to power the recycle pump. The energy recovery device may use electrical, mechanical or pressure energy transfer to reduce the amount of energy from external sources used to drive the recycle pump.

In one form, the energy recovery device includes an impeller coupled to a turbine.

In an alternative form, the energy recovery device is in the form of a positive displacement pressure exchanger arranged to exchange pressure from the pressurised treated effluent to the recycle conduit. The energy recovery device may be in the form of a positive displacement pressure exchanger.

In a preferred example, the positive displacement pressure exchanger has a rotating member with a plurality of chambers, a high pressure inlet coupled to receive the pressurised treated effluent rich in dissolved gas, a low pressure outlet coupled to expel the treated effluent from the high pressure inlet to the bubble release point, a low pressure inlet coupled to receive treated effluent from the outlet conduit, and a high pressure outlet coupled to feed the treated effluent from the low pressure inlet to the means for dissolving gas in the effluent, wherein rotation of the member causes the chambers to exchange parcels of effluent from the high pressure inlet to the low pressure outlet and from the low pressure inlet and the high pressure outlet.

Preferably, the means for dissolving gas in the effluent includes a saturator located between the high pressure outlet and the high pressure inlet. More preferably, the means for dissolving gas in the effluent includes a pressurised gas supply arranged for feeding pressurised gas to the saturator.

Preferably, the recycle pump is located between the high pressure outlet of the energy recovery device and the saturator. In one form, an additional recycle pump is located in the recycle conduit upstream of the pressure exchanger. More preferably, the liquid treatment system includes a saturator level control pump arranged between the outlet conduit and the saturator in parallel with the recycle pumps, for maintaining a level of effluent in the saturator.

In a preferred form, the gas is air. The liquid influent may be raw water, such as water used for drinking water that may have been sourced from a range of sources including dams (i.e. rain water), the ocean (i.e within a desalination water treatment plant), stormwater, bores, etc. In other examples, the liquid influent may be waste water including industrial waste water and/or sewage.

In accordance with another example of the present invention, there is provided a method of treating liquid including the steps of:

using gas flotation to remove suspended matter from liquid influent, including feeding the liquid influent into a flotation tank, pressurising and dissolving gas into the liquid, and feeding the pressurised liquid to a bubble release point, using an energy recovery device to reduce pressure of the liquid before the bubble release point such that gas bubbles are released into the flotation tank for floating said suspended matter to a surface of the liquid in the tank; and operating the energy recovery device to supply energy obtained from the pressure reduction of the liquid.

Preferably, the method includes the steps of:
recycling treated effluent from the tank,
pressurising and dissolving gas into the recycled treated effluent,
feeding the pressurised recycled effluent to the bubble release point,
using the energy recovery device to reduce pressure of the treated effluent before the bubble release point; and
operating the energy recovery device to supply energy obtained from the pressure reduction of the treated effluent.

Preferably, the energy recovery device is in the form of a pressure exchanger, and the method further includes the step of:
operating the pressure exchanger to use the pressure decrease before the bubble release point to produce a pressure increase in a feed of the recycled treated effluent.

Preferably, the method includes the step of:
operating the pressure exchanger to use the pressure decrease before the bubble release point to produce a pressure increase in a feed of the recycled treated effluent to a saturator where the gas is dissolved into the recycled treated effluent.

Preferably, the method uses a water treatment system as describe above.

BRIEF DESCRIPTION OF THE DRAWINGS

The invention is described, by way of non-limiting example only, with reference to the accompanying drawings in which.

DETAILED DESCRIPTION

Figure 1:
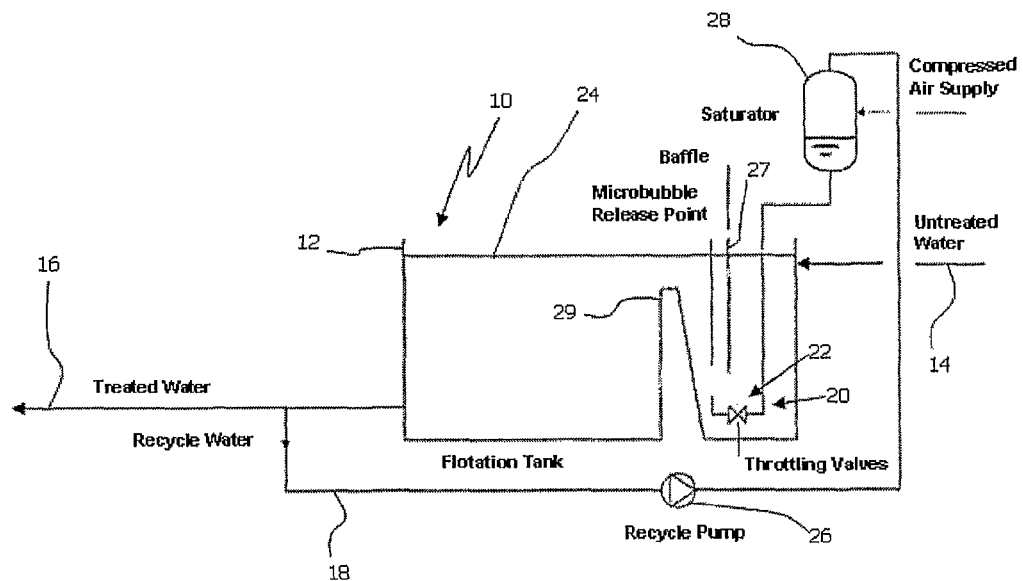
FIG. 1 is a diagrammatic view of a water treatment system using existing Dissolved Air Flotation (DAF) technology.

With reference to FIG. 1, there is shown a potable water treatment system 10 which uses Dissolved Air Flotation (DAF) to separate suspended matter from water influent (for example, toward providing potable water). The water influent may be sourced from a river, dam, or otherwise. The water treatment system 10 includes a flotation tank 12 into which the water influent is fed through an inlet 14, and an outlet conduit 16 through which treated effluent is fed from the flotation tank 12. A recycle conduit 18 branches off from the outlet conduit 16 for feeding treated effluent to a bubble release point 20 located in a lower portion of the flotation tank 12. Throttling valves 22 are used before the bubble release point 20 for releasing gas bubbles from the treated effluent such that the bubbles attach to suspended matter in the water within the flotation tank 12 so as to float suspended matter to the surface 24 where it can be removed by surface scraping or the like.

The water treatment system 10 incorporates means for pressurising the treated effluent in the recycle conduit 18 and dissolving air in the pressurised treated effluent, such that the dissolved air can then be released from the treated effluent at the throttling valves 22. The means for pressurising the treated effluent in the recycle conduit may include a recycle pump 26, and a saturator 28 may be used for dissolving air in the pressurised treated effluent. The saturator 28 has a supply of pressurised air fed thereto to dissolve the air into the pressurised treated effluent. More than one recycle pump 26 may be used, as may be required, depending on the specifics of the particular system.

Accordingly, the water treatment system 10 removes suspended matter from the water influent by using bubbles which result from dissolving air into and then releasing air from the water. The air bubbles adhere to suspended matter and then float to the surface, separating impurities from the water, enabling removal of suspended matter by skimming. More specifically, recycled water is drawn out of the treated water stream from where the recycle conduit 18 branches off from the outlet conduit 16. The pressure of the water fed through the recycle conduit 18 is increased by the recycle pump 26. Compressed/pressurised air is dissolved into the recycled treated effluent in the saturator 28. Dissolved air rich recycled treated effluent then flows out of the saturator 28 under pressure to the throttling valves 22 at which point the pressure of the water is reduced, thereby causing air dissolved in the recycled water to be released from the solution in the form of micro-bubbles. Conduit conveys this water to the bubble release point 20. The released micro-bubbles then attach to suspended matter in the influent water causing suspended matter to float and separate from the influent water, thereby treating the water.

Generally speaking, the DAF process separates and removes suspended matter from liquid based on changes in the solubility of gas in liquid as pressure varies. The air is dissolved under pressure in a liquid, usually recycled effluent from the DAF unit, and is fed into the raw feed/influent stream. Upon entering the DAF unit, the pressure of the dissolved air rich liquid is reduced, causing the liquid to become super-saturated with gas causing the formation of bubbles. The anionically-charged, preferably micron sized air bubbles attach to suspended matter reducing the specific gravity of the agglomerate to less than that of water, thus effectively causing the suspended matter to float to the liquid surface, forming a floating sludge layer that is able to be removed by various methods including skimmers.

In a particular example, heavier solids may settle to the bottom of the tank and may be raked to a sludge pocket for removal. Clear liquid may be withdrawn under a tank baffle 27 and over a weir 29 for disposal or reuse.

However, the applicant has identified that the water treatment system 10 shown in FIG. 1 is inefficient owing to the wastage of energy at the pressure drop across the throttling valves 22, and has determined that it would be beneficial to improve the efficiency so as to promote wider application of the DAF process. More specifically, in the DAF process illustrated in FIG. 1, the efficiency is poor due to the energy being released at the throttling valve. In particular, the reduction in pressure at the bubble release point 20 is converted into heat, which serves only to warm the water to a small extent, with no energy being effectively recovered. The applicant has identified that it would be beneficial if the pressure drop across the DAF throttling valves 22 could be used to boost/increase the suction pressure of the DAF recycle pump 26, thereby saving energy that would otherwise have been wasted. The DAF recycle pump 26 would then need only to supply energy to overcome losses in the pipework, Energy Recovery Devices (ERDs) and liquid level differences in the system. It has been determined that this may be achieved by using ERDs in place of the throttling valves 22, and may take various forms, examples of which are shown in FIGS. 2 to 5.

By installing ERDs at the locations identified in FIGS. 2 to 5, the energy from the pressure reduction before the bubble release point 20 is able to be transferred to the flow of water being fed to the recycle pump 26. As such, instead of pumping the water up to a pressure and then wasting the pressure energy at the throttling valves 22, the applicant has proposed that the energy is transferred to the flow of water being fed to the recycle pump 26, thus reducing the pumping energy required by the recycle pump 26.

Figure 2:
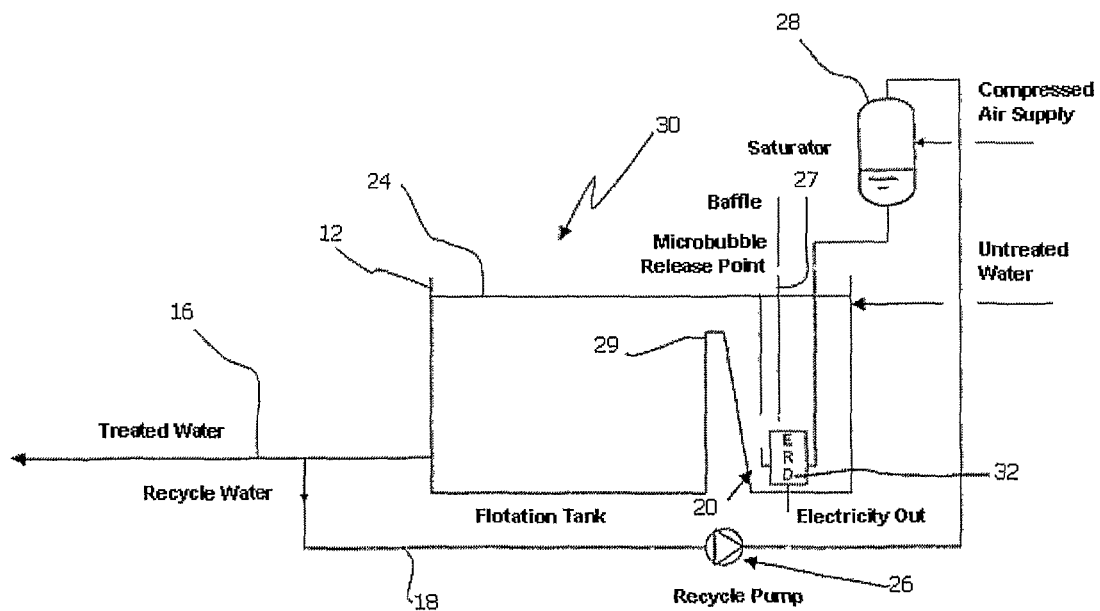
FIG. 2 is a diagrammatic view of a water treatment system using DAF and incorporating an Energy Recovery Device, in accordance with a first example of the present invention.

Referring to FIG. 2, there is shown a water treatment system 30 which incorporates an ERD 32, in accordance with a first example of the present invention. The ERD 32 is used for reducing the pressure of the treated effluent before the bubble release point 20, in place of the throttling valves 22 used in the arrangement shown in FIG. 1. In this way, the pressure of the treated effluent is reduced across by the ERD 32, and further to this bubbles are released into the flotation tank 12 for floating the suspended matter to the surface 24 of the water in the tank 12. The ERD 32 supplies energy obtained through the pressure reduction of the treated effluent. The water treatment system 30 shown in FIG. 2 has features similar to the water treatment system 10 shown in FIG. 1, and similar features are designated with similar reference numerals.

The ERD 32 may take various forms to supply the energy obtained through the pressure reduction of the treated effluent and, in one example, may generate electricity that can be used for various purposes (eg. including reducing the power consumed by the recycle pump 26 and/or supplying power to an external process). Although the example shown in FIG. 2 illustrates a single ERD 32, it will be understood by those skilled in the art that alternative examples may have more than one ERD 32.

Figure 3:
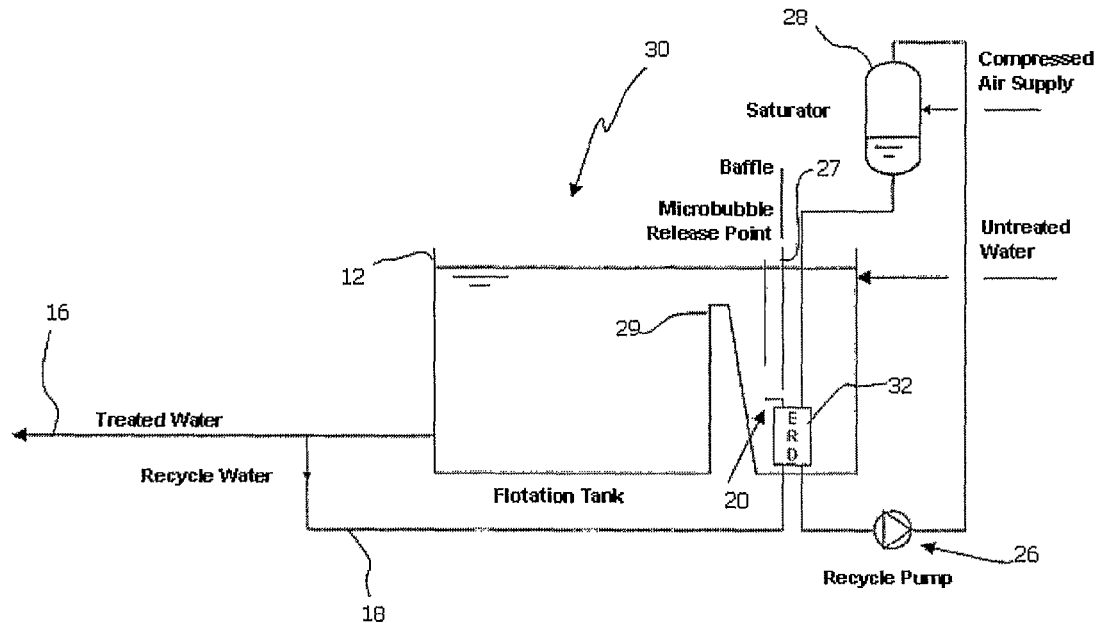
FIG. 3 is a diagrammatic view of a water treatment system using DAF and incorporating a turbo pressure exchange Energy Recovery Device, in accordance with a second example of the present invention.

As an alternative to using recovered energy to generate electricity, the ERD 32 may use the energy recovered from the pressure reduction of the recycled treated effluent to increase the suction pressure of the recycle pump 26 by mechanical or pressure energy transfer. Examples of arrangements using mechanical energy transfer in this way are shown in FIGS. 3 and 4, and may be achieved in one form by using a turbo pressure exchanger.

By using an ERD 32 in the arrangements shown in FIGS. 2 to 5, the requirement of the recycle pumps for energy from a source that is external to the system may be reduced due to the availability of energy provided by the ERD 32.

Figure 4:
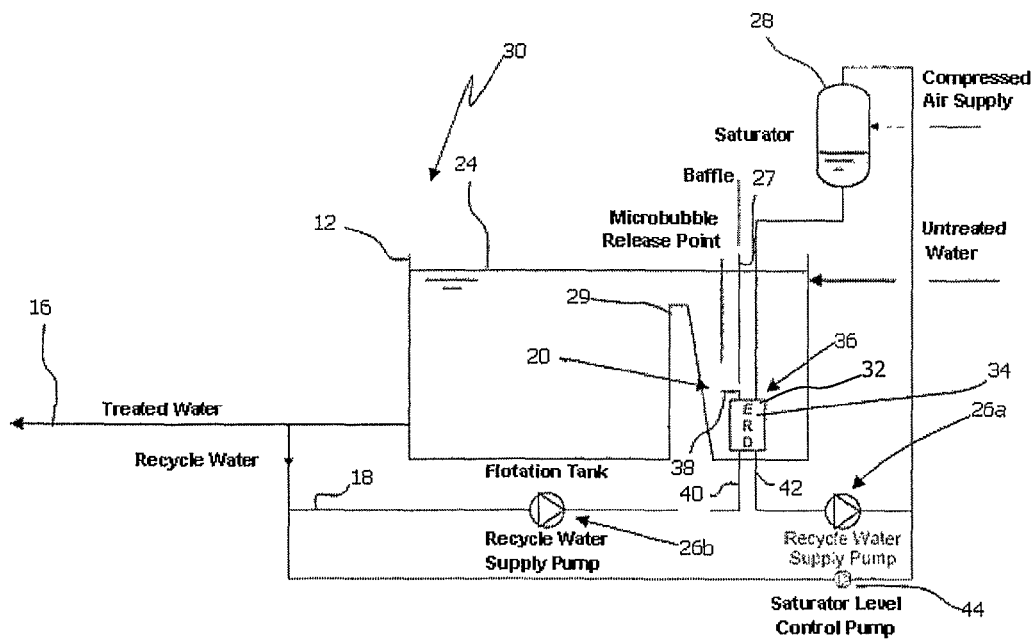
FIG. 4 is a diagrammatic view of a water treatment system using DAF and incorporating a positive displacement pressure exchange Energy Recovery Device, in accordance with a third example of the present invention.

FIG. 4 shows an example in which the ERD 32 is in the form of a positive displacement pressure exchanger 34 arranged to exchange pressure between the pressurised treated effluent to the recycle conduit 18. More specifically, the positive displacement pressure exchanger 34 transfers pressure from the pressure drop before the bubble release point 20 so as to pressurise the treated effluent in the recycle conduit 18. In one particular example, the pressure exchanger 34 has a rotating barrel member with one or more of parcel chambers, a high pressure inlet 36 coupled to receive the pressurised treated effluent rich with dissolved air, a low pressure outlet 38 coupled to expel the treated effluent from the high pressure inlet 36 to the bubble release point 20, a low pressure inlet 40 coupled to receive treated effluent from the outlet conduit 16, and a high pressure outlet 42 coupled to feed the treated effluent from the low pressure inlet 40 to the saturator 28. The pressure exchanger 34 is arranged such that rotation of the rotating barrel member causes the parcel chambers to exchange parcels of effluent from the high pressure inlet 36 to the lower pressure outlet 38, and from the low pressure inlet 40 to the high pressure outlet 42. The saturator 28 is located between the high pressure outlet 42 and the high pressure inlet 36, and includes a compressed air supply for feeding compressed air to the saturator 28.

A downstream recycle pump 26a is located between the high pressure outlet 42 and the saturator 28, and an additional, upstream recycle pump 26b is located on the recycle conduit 18 upstream of the pressure exchanger 34. The water treatment system 30 shown in FIG. 4 also includes a saturator level control pump 44 arranged between the outlet conduit 16 and the saturator 28, in parallel with the recycle pumps 26a, 26b, so as to maintain a level of effluent in the saturator 28. In the arrangement shown in FIG. 4, the majority of the recycled water flow goes to the upstream recycle pump 26b, and a small amount of the recycle water flow goes to the saturator level control pump 44 to maintain the recycle water level in the saturator 28.

Using the arrangement described above, the ERD 32 exchanges parcels of recycled effluent between its high pressure side and its low pressure side. The rotating barrel member of the ERD 32 is like the barrel of a revolver. As the barrel rotates, dissolved air rich effluent water at high pressure flows into the parcel chambers on the high pressure side of the ERD 32, filling these chambers. As the barrel of the revolver continues to rotate, this water moves from the high pressure side of the ERD 32 to the low pressure side of the ERD 32. When this water reaches the low pressure side of the ERD 32 the pressure in the water is reduced and dissolved air in the water is released from the solution, forming micro-bubbles. This water is pushed out of the ERD 32 by recycled water from the upstream recycle pump 26b. The water that is pushed out of the parcel chamber at this point is pushed out the same end of the parcel chamber that it originally entered. This water is conveyed to the bubble release point 20 where it treats the influent water in the same way that influent water is treated using conventional DAF technology.

The parcel chamber in question is now filled with recycled water from the upstream recycle pump 26b at low pressure. As the barrel of the revolver continues to rotate, the parcel chamber in question carrying new recycled effluent at low pressure moves from the low pressure side of the ERD 32 to the high pressure side of the ERD 32. At this point, the new effluent is now at high pressure and, pressurised air rich water from the saturator 28 pushes this new water back out the same end of the parcel chamber that it originally entered, and it continues towards the downstream recycle pump 26a. The parcel chamber is now again full of dissolved air rich water at high pressure, and the above-described ERD process repeats itself, continuing indefinitely while the ERD 32 is running. It must also be noted that there can be many parcel chambers in the revolver so that the above described ERD process occurs for many parcel chambers simultaneously.

The recycled water exiting the ERD 32 and continuing to the downstream recycle pump 26a continues to the saturator 28 where pressurised air is dissolved into the recycled water, as is the case in conventional DAF technology.

One particular form of positive displacement pressure exchanger 34 which may be suitable for use in the water treatment system 30 of the present invention is described in U.S. Pat. No. 7,201,557, the contents of which is incorporated herein in its entirety by reference. This form of positive displacement pressure exchanger 34 has been used previously with "Reverse Osmosis" water treatment plants, such as, for example, desalination plants. However, considerable design and conceptual work has been required to adapt the positive displacement pressure exchanger 34 ERD type of technology to a DAF system, and further design changes of the actual ERD technology may be required or at least desirable given water treatment conditions particular to the DAF process. The contrasts between Reverse Osmosis systems and DAF water treatment systems, and the need to adapt the connection of DAF technology, together with the specialist nature of the water industry may have reduced the opportunity for understanding the potential benefits of ERD technology within the DAF industry previously.

Figure 5:
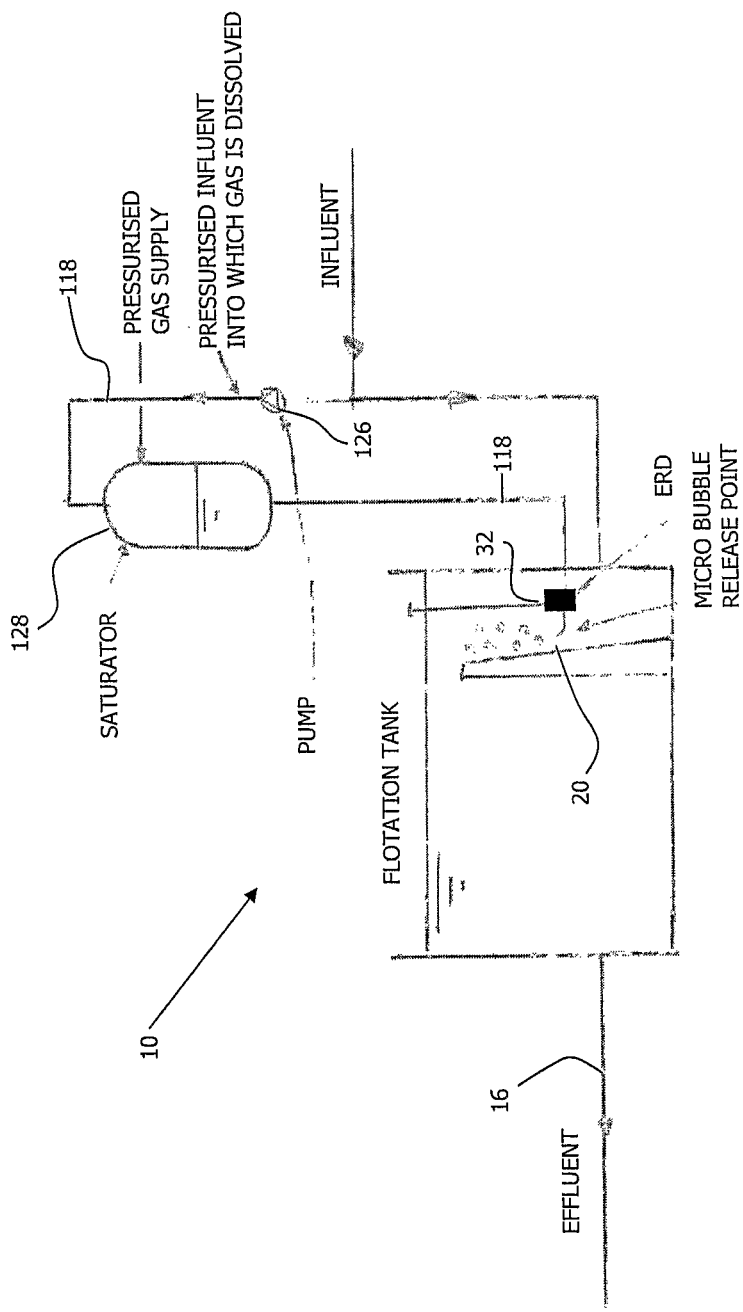
FIG. 5 is a diagrammatic view of a water treatment system using DAF and an Energy Recovery Device, in accordance with a fourth example of the present invention.

With reference to FIG. 5, there is shown an alternative liquid treatment system 10 in accordance with an example of the present invention, wherein there is no recycle conduit. Instead, a separation conduit 118 branches from the inlet conduit and feeds a portion of the influent liquid to a pump 126 which pressurises the influent, and a saturator 128 which dissolves pressurised gas in the pressurised influent. The separation conduit 118 leads to an ERD 32, and otherwise the operation of the system 10 is similar to the other systems described with reference to FIGS. 2 to 4.

Advantageously, water treatment systems in accordance with examples of the present invention may be able to decrease energy consumption of the recycle pumps and associated costs within a DAF water treatment system by 50 to 90% of current DAF technologies. DAF is often a more viable treatment option than competing treatment methods due to its higher processing rate, smaller footprint, capacity for stop/start operations and greater efficiency where solids have propensity to float (e.g. oil and fat). DAF's key disadvantage, when compared to competing technologies, is its greater energy consumption of a factor of approximately 2.5 times higher, making it a significant proportion of operating costs. Providing a solution for DAF that reduces energy consumption close to the same level enjoyed by competing technologies removes one of its key barriers to wider implementation.

Also advantageously, examples of the present invention can be retrofitted to existing systems as well as incorporated in new plant systems. The process can be used on a range of raw water inputs typical in a treatment of both potable and waste water applications leading to broad global application across industries including poultry processing, canning, seafood processing, snack foods, storm water treatment, power plants, chemical processing plants, tanning, pulp and paper, mining, algae removal, automotive, oil refining, municipal sludge thickening and clarification. The treatment system may be for treating industrial wastewater streams and other types of 'raw water' used for drinking water that may have been sourced from a range of sources including dams (i.e. rain water), the ocean (i.e within a desalination water treatment plant), stormwater, bores, etc.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

It will be understood by those skilled in the art that examples of the present invention may incorporate filtering of the liquid before it is fed to the ERD, particularly where the ERD is a positive displacement type of pressure exchanger (filters could follow flotation). However, for other types of pressure exchangers, eg a turbine driven pump or other device that may handle suspended matter in the recycle, it may be possible to apply to systems where the influent is pressurised or to liquids where the treated effluent contains suspended matter that may adversely affect the operation of a positive displacement pressure exchanger. A positive displacement type pressure exchanger may be used without such filtering of the liquid provided it can cope with suspended matter in the liquid.

Although the invention is described as using a positive displacement pressure exchanger, it will be understood that other types of pressure exchangers may be used. For example "Turbo" pressure exchangers are generally centrifugal type pump impellers directly connected by a shaft to a hydroturbine, and may be utilised in other examples of the invention.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A liquid treatment system using gas flotation to separate suspended matter from liquid influent, including a flotation tank into which the liquid influent is fed through an inlet, an outlet conduit through which treated effluent is fed from the flotation tank, a separation conduit for feeding liquid to a bubble release point, means for pressurising the liquid in the separation conduit and dissolving gas in the comparising a saturator, wherein an energy recovery device is used for reducing pressure of the liquid before the bubble release point such that gas bubbles are released into the flotation tank for floating said suspended matter to a surface of the liquid in the tank, and wherein the energy recovery device supplies energy obtained through said pressure reduction of the liquid, wherein the separation conduit is in the form of a recycle conduit for feeding treated effluent to the bubble release point, said pressurising/dissolving means is arranged to pressurise the treated effluent in the recycle conduit and dissolve gas in the pressurised treated effluent, and the energy recovery device is used for reducing pressure of the treated effluent before the bubble release point, and wherein the energy recovery device supplies energy obtained through said pressure reduction of the treated effluent, wherein the means for pressurising the treated effluent in the recycle conduit includes a recycle pump, wherein pressurisation of the treated effluent by the recycle pump is powered or supplemented by energy provided by the energy recovery device, wherein the energy recovery device uses mechanical energy transfer to power or supplement the pressurisation of the treated effluent by the recycle pump with energy obtained through the pressure reduction of the treated effluent, wherein the energy recovery device is in the form of a pressure exchanger arranged to exchange pressure from the pressurised treated effluent to the recycle conduit, wherein the energy recovery device is in the form of a positive displacement pressure exchanger, wherein the positive displacement pressure exchanger has a rotating member with a plurality of chambers, a high pressure inlet coupled to receive the pressurised treated effluent with dissolved gas, a low pressure outlet coupled to expel the treated effluent from the high pressure inlet to the bubble release point, a low pressure inlet coupled to receive treated effluent from the outlet conduit, and a high pressure outlet coupled to feed the treated effluent from the low pressure inlet to the means for dissolving gas in the effluent, wherein rotation of the member causes the chambers to exchange parcels of effluent from the high pressure inlet to the low pressure outlet and from the low pressure inlet and the high pressure outlet, wherein the recycle pump is located between the high pressure outlet and the saturator, wherein the liquid treatment system also includes a saturator level control pump arranged between the outlet conduit and the saturator in parallel with the recycle pumps, for maintaining a level of effluent in the saturator.

2. The liquid treatment system as claimed in claim 1, wherein the means for dissolving gas in the effluent includes the saturator located between the high pressure outlet and the high pressure inlet.

3. The liquid treatment system as claimed in claim 2, wherein the means for dissolving gas in the effluent includes a pressurised gas supply arranged for feeding pressurised gas to the saturator.

4. The liquid treatment system as claimed in claim 1, wherein an additional recycle pump is located in the recycle conduit upstream of the pressure exchanger.

* * * * *